United States Patent
Hammer et al.

(10) Patent No.: US 9,464,587 B2
(45) Date of Patent: Oct. 11, 2016

(54) METHOD FOR OPERATING AN INTERNAL COMBUSTION ENGINE FOR FAVORABLE EXHAUST GAS TREATMENT

(71) Applicant: Robert Bosch GmbH, Stuttgart (DE)

(72) Inventors: Andreas Hammer, Ludwigsburg (DE); Oliver Zink, Muggensturm (DE)

(73) Assignee: Robert Bosch GmbH, Stuttgart (DE)

(*) Notice: Subject to any disclaimer, the term of this patent is extended or adjusted under 35 U.S.C. 154(b) by 590 days.

(21) Appl. No.: 13/772,466

(22) Filed: Feb. 21, 2013

(65) Prior Publication Data

US 2013/0231842 A1 Sep. 5, 2013

(30) Foreign Application Priority Data

Mar. 1, 2012 (DE) .................. 10 2012 203 223
Mar. 20, 2012 (DE) .................. 10 2012 204 352

(51) Int. Cl.
*F02D 41/02* (2006.01)
*B60W 20/00* (2016.01)
(Continued)

(52) U.S. Cl.
CPC .......... *F02D 41/0235* (2013.01); *B60W 10/06* (2013.01); *B60W 10/08* (2013.01); *B60W 20/00* (2013.01); *B60W 20/16* (2016.01); *B60W 30/1882* (2013.01); *B60W 2510/06* (2013.01); *B60W 2510/068* (2013.01); *B60W 2510/0638* (2013.01); *F01N 3/208* (2013.01); *F01N 2900/1402* (2013.01); *F02D 41/146* (2013.01); *F02D 41/1445* (2013.01); *F02D 41/1446* (2013.01); *F02D 41/1463* (2013.01); *F02D 2200/0802* (2013.01); *F02D 2250/24* (2013.01);
(Continued)

(58) Field of Classification Search
CPC ........... F02D 41/0235; F02D 41/1446; F02D 41/0245; F02D 41/024; F02D 41/025; F02D 41/0255; F02D 41/027; F02D 41/0275; F02D 2041/026; F02D 2041/0265; F02N 11/00
USPC ............... 60/285; 180/65.28, 65.285, 65.265
See application file for complete search history.

(56) References Cited

U.S. PATENT DOCUMENTS 5,428,252 A 6/1995 Walker et al.
5,698,965 A 12/1997 York
(Continued)

FOREIGN PATENT DOCUMENTS

DE 19752969 6/1999
DE 102004033836 9/2005
(Continued)

*Primary Examiner* — Lindsay Low
*Assistant Examiner* — George Jin
(74) *Attorney, Agent, or Firm* — Michael Best & Friedrich LLP

(57) ABSTRACT

The invention discloses a method for operating a drive device (10), in particular in a motor vehicle, comprising an internal combustion engine (12) and at least one further drive assembly (28) which is not an internal combustion engine (12), wherein an exhaust gas from the internal combustion engine (12) is treated by means of an exhaust gas treatment system (16), and wherein it is checked whether the internal combustion engine (12) is in an operating point defined as favorable for the exhaust gas treatment, and wherein then if it is found that the internal combustion engine (12) is not in an operating point defined as favorable for the exhaust gas treatment, the operating point of the internal combustion engine (12) is brought using the further drive assembly (28) into a range defined as favorable for the exhaust gas treatment.

20 Claims, 4 Drawing Sheets

(51) Int. Cl.
*B60W 10/06* (2006.01)
*B60W 10/08* (2006.01)
F02D 41/14 (2006.01)
B60W 30/188 (2012.01)
F01N 3/20 (2006.01)

(52) U.S. Cl.
CPC ............ *Y02T 10/54* (2013.01); *Y02T 10/6286* (2013.01); *Y10S 903/902* (2013.01)

(56) References Cited

U.S. PATENT DOCUMENTS

| | | | |
|---|---|---|---|
| 5,739,670 | A | 4/1998 | Brost et al. |
| 2003/0173123 | A1* | 9/2003 | Nakanowatari ............... 180/65.2 |
| 2005/0262827 | A1* | 12/2005 | Ichimoto et al. ................ 60/277 |
| 2006/0016175 | A1* | 1/2006 | Pott et al. ........................ 60/285 |
| 2007/0205028 | A1* | 9/2007 | Leone et al. ................. 180/65.2 |
| 2008/0078166 | A1* | 4/2008 | Rose et al. ....................... 60/284 |
| 2009/0018756 | A1* | 1/2009 | Storhok et al. ............... 701/105 |
| 2009/0025371 | A1* | 1/2009 | Hermansson et al. ......... 60/286 |
| 2010/0043402 | A1* | 2/2010 | Perry et al. ..................... 60/285 |
| 2010/0107606 | A1* | 5/2010 | Narayanaswamy et al. ... 60/274 |
| 2010/0174498 | A1 | 7/2010 | Goff et al. |
| 2010/0180578 | A1* | 7/2010 | Goda ............................... 60/285 |
| 2010/0212295 | A1* | 8/2010 | Narayanaswamy et al. ... 60/285 |
| 2010/0251996 | A1* | 10/2010 | Akimoto ................... 123/406.23 |
| 2010/0280740 | A1* | 11/2010 | Oe ................................. 701/102 |
| 2011/0139524 | A1* | 6/2011 | Heinrich et al. ......... 180/65.265 |
| 2012/0055138 | A1* | 3/2012 | Sloane ............... B01D 53/9495 60/274 |
| 2012/0079822 | A1* | 4/2012 | Yacoub ........................... 60/597 |
| 2012/0173062 | A1* | 7/2012 | Madurai Kumar et al. .... 701/22 |
| 2012/0232731 | A1* | 9/2012 | Sujan et al. ..................... 701/22 |

FOREIGN PATENT DOCUMENTS

| | | |
|---|---|---|
| DE | 102007008745 | 9/2007 |
| DE | 102007026144 | 1/2008 |
| DE | 102007015875 | 10/2008 |
| DE | 102008010103 | 8/2009 |
| EP | 1197642 | 4/2002 |
| GB | 2451562 | 2/2009 |
| WO | 2008/094116 | 8/2008 |

* cited by examiner ured such that the internal combustion engine is loaded additionally. Thus also a so-called low-load operation of the internal combustion engine, which can also constitute an unfavorable operating point, can be avoided.
METHOD FOR OPERATING AN INTERNAL COMBUSTION ENGINE FOR FAVORABLE EXHAUST GAS TREATMENT

BACKGROUND OF THE INVENTION

The invention concerns a method and a control and/or regulator device and a computer program.

Motor vehicles, in particular diesel motor vehicles, which have an exhaust gas treatment system which for example comprises an SCR catalyst (SCR means "selective catalytic reduction"), are known from the market. With these systems it is possible to reduce nitrous oxides (NOx) in the exhaust gasses. The extent of reduction of nitrous oxides ("NOx turnover") can vary as a function of an operating state of an internal combustion engine of the motor vehicle, a temperature of the exhaust gas or SCR catalyst and further parameters.

SUMMARY OF THE INVENTION

The method according to the invention has the advantage that in a motor vehicle with a so-called hybrid drive, nitrous oxides (NOx) in the exhaust gasses of an internal combustion engine can be reduced particularly well, which means that the so-called NOx turnover can be maximized. For example an operating temperature of an exhaust gas treatment system, in particular a catalyst, of the internal combustion engine and/or a proportion of the untreated NOx emissions in the exhaust gas can be set optimally.

The invention concerns a method for operating a drive assembly, in particular in a motor vehicle, comprising an internal combustion engine and at least one further drive assembly which is not an internal combustion engine, wherein an exhaust gas from the internal combustion engine is treated by means of an exhaust treatment system. The exhaust gas treatment system comprises at least one exhaust catalyst. According to the invention it is checked whether the internal combustion engine is in an operating point defined as favorable for the exhaust gas treatment. If it is found that the internal combustion engine is not in an operating point defined as favorable for the exhaust gas treatment, the operating point of the internal combustion engine is brought using the further drive assembly into a range defined as favorable for exhaust gas treatment.

A "favorable" operating point in the sense of the invention is when operating values, in particular a torque and/or rotation speed, of the internal combustion engine and/or operating values of the exhaust gas treatment system have values which lead to particularly low untreated NOx emissions (upstream of the catalyst reducing the nitrous oxides) and/or a particularly low NOx proportion in the exhaust gas downstream of the catalyst and/or particularly rapid reaching of an operating temperature of the catalyst. Here at least part of the time a compromise selected according to pre-definable criteria between the said operating values can be a favorable operating point. It is known that a catalyst has comparatively poor NOx conversion properties below a specific operating temperature. In the simplest case the "favorable" operating point is therefore defined by an operating parameter which stands in a specific relation to an established limit value.

In particular according to the invention the at least one further drive assembly is used to change the operating point of the internal combustion engine where applicable. For example by means of the further drive assembly the load on the internal combustion engine can be relieved if the drive assembly is used as support. Thus a so-called high-load operation, which in general constitutes an unfavorable (i.e. not favorable) operating point, can be substantially avoided. Also depending on the respective embodiment of the further drive assembly, this can be operated where applicable such that the internal combustion engine is loaded additionally. Thus also a so-called low-load operation of the internal combustion engine, which can also constitute an unfavorable operating point, can be avoided.

In one embodiment of the method according to the invention the range of the operating points defined as favorable for exhaust gas treatment of the internal combustion engine is defined by at least one map and corresponding limit values, wherein the at least one map is formed by an effective mean pressure in a combustion chamber (cylinder) of the internal combustion engine and a rotation speed of the internal combustion engine or equivalent values. Here the effective mean pressure substantially characterizes a torque of the internal combustion engine. For example by means of the map, a three-dimensional correlation can be described between the mean pressure, the rotation speed and the NOx turnover in the catalyst. Also by means of the (or another) map, a three-dimensional correlation can be described between the mean pressure, the rotation speed and a temperature of the catalyst and/or exhaust gas. Thus essential operating values of the internal combustion engine are brought into a correlation particularly suitable for the method. Maps are particularly suitable for describing the values characterizing the internal combustion engine and exhaust gas treatment system.

Furthermore the method according to the invention proposes that in determining the operating point defined as favorable for exhaust gas treatment, at least one of the following input values is taken into account: temperature of exhaust gas; volume flow of exhaust gas; concentration of hydrocarbons (HC) in the exhaust gas; concentration of nitrous oxides in the exhaust gas upstream of the exhaust gas treatment system (untreated NOx emissions); concentration of nitrous oxides in the exhaust gas downstream of the exhaust gas treatment system; ratio of NO2 (nitrogen dioxide) to NOx (other nitrogen-oxygen compounds) in the exhaust gas; enthalpy of the exhaust gas; operating state of the exhaust gas treatment system; driver's desired torque; gear engaged; and/or charge state of an energy accumulator.

In addition to these values, a quantity of a reducing agent introduced into the exhaust gas treatment system and/or a quality of the mixture ("equipartition") of the reducing agent in the exhaust gas can also determine the operating point defined as favorable. Furthermore the operating point defined as favorable can depend on the respective embodiment of the internal combustion engine and/or the exhaust gas treatment system, for example the respective catalyst technology. Taking into account at least one—preferably several—of the values described here, the operating point described as favorable can be determined advantageously in particular in relation to the NOx turnover of the catalyst. This is preferably achieved using data stored in the map.

Furthermore it is proposed that the internal combustion engine is a diesel engine and that the exhaust gas treatment system comprises an SCR catalyst (SCR means "selective catalytic reduction"). Diesel engines generally produce a particularly high NOx proportion in relation to untreated exhaust gas emissions, and an SCR catalyst can reduce the nitrous oxides in the exhaust gas to a particularly great extent.

The method according to the invention can be performed particularly effectively if the further drive assembly is supplied with energy via an additional electric, hydraulic or thermal accumulator, in particular it is an electric motor or a hydraulic motor. The electric motor can easily be switched on or off in drive mode of the motor vehicle and can also easily be switched between motor operation and generator operation. In generator mode preferably a battery or other electrical energy accumulator of the motor vehicle can be charged, whereby in a low-load operation as mentioned above, the internal combustion engine can be loaded additionally and hence operated at a more favorable operating point.

Furthermore it is proposed that the internal combustion engine is controlled and/or regulated such that the torque and/or rotation speed of the internal combustion engine preferably have an approximately medium value. In the present case a "medium" value of the torque means that the torque is between 20% and 50% of the maximum torque of the internal combustion engine. A "medium" value of the rotation speed means that the rotation speed is between around 20% and 80% of the maximum rotation speed of the internal combustion engine. If therefore the torque and rotation speed each have "medium" values, both the operating temperature of the SCR catalyst can be optimized and the NOx turnover achieved in the exhaust gas treatment system can be maximized.

It is furthermore proposed that using at least one of the input values described above, a value characterizing the driver's desired torque and/or a value characterizing a load ratio of the internal combustion engine and electric motor are determined, and that the value or values determined are transmitted to a control and/or regulator device for the internal combustion engine and for the electric motor. Thus taking into account a present driver's desired torque, a present operating point of the internal combustion engine and the electric motor and further values, by means of the control and/or regulator device the operating point of the internal combustion engine can be brought using the electric motor into a range considered favorable for exhaust gas treatment.

In addition it is provided that a lower and a upper limit value are predefined in order to limit the driver's desired torque or a resulting "torque request" of the control and/or regulator device. Thus depending on the respective driving situation, the driver's desired torque can be restricted where applicable to a suitable level.

An embodiment of the invention provides that at a comparatively low torque and/or low rotation speed of the internal combustion engine, the electric motor is driven as a generator in order to load the internal combustion engine additionally and thus bring it into the desired operating point range. Thus the internal combustion engine can be operated in a more favorable range of torque and rotation speed by means of "load switching" and hence the NOx turnover in the catalyst can be increased. The electrical energy obtained is preferably used to charge a battery allocated to the electric motor.

Correspondingly at a comparatively high torque and/or high rotation speed of the internal combustion engine, the further drive assembly or electric motor can be operated as a motor to relieve the load on the internal combustion engine and thus bring it into the desired operating point range. "High-load points" of the internal combustion engine with a low NOx turnover in the catalyst can thus be avoided by switching on the further drive assembly. Here in the case of the electric motor, the energy previously stored in generator mode can advantageously be used for drive. For example switching on the electric motor allows the avoidance of high NOx proportions during operation outside an applicable actuation range of an exhaust gas recirculation of the internal combustion engine. Also it is possible according to the invention to switch off the internal combustion engine completely for a specific period, and use the electric motor(s) as the sole drive in the drive device.

The method according to the invention can be performed particularly simply and safely if it is carried out using stored data and/or at least one map and/or at least one mathematical operation. This is carried out for example in the control and/or regulator device which in particular comprises a computer program which is programmed to operate the drive device in the manner according to the invention.

BRIEF DESCRIPTION OF THE DRAWINGS

Example embodiments of the invention are explained below with reference to the drawing. The drawing shows.

The same reference numerals are used for elements and values of equivalent function in all figures, even in different embodiments.

DETAILED DESCRIPTION

Figure 1:
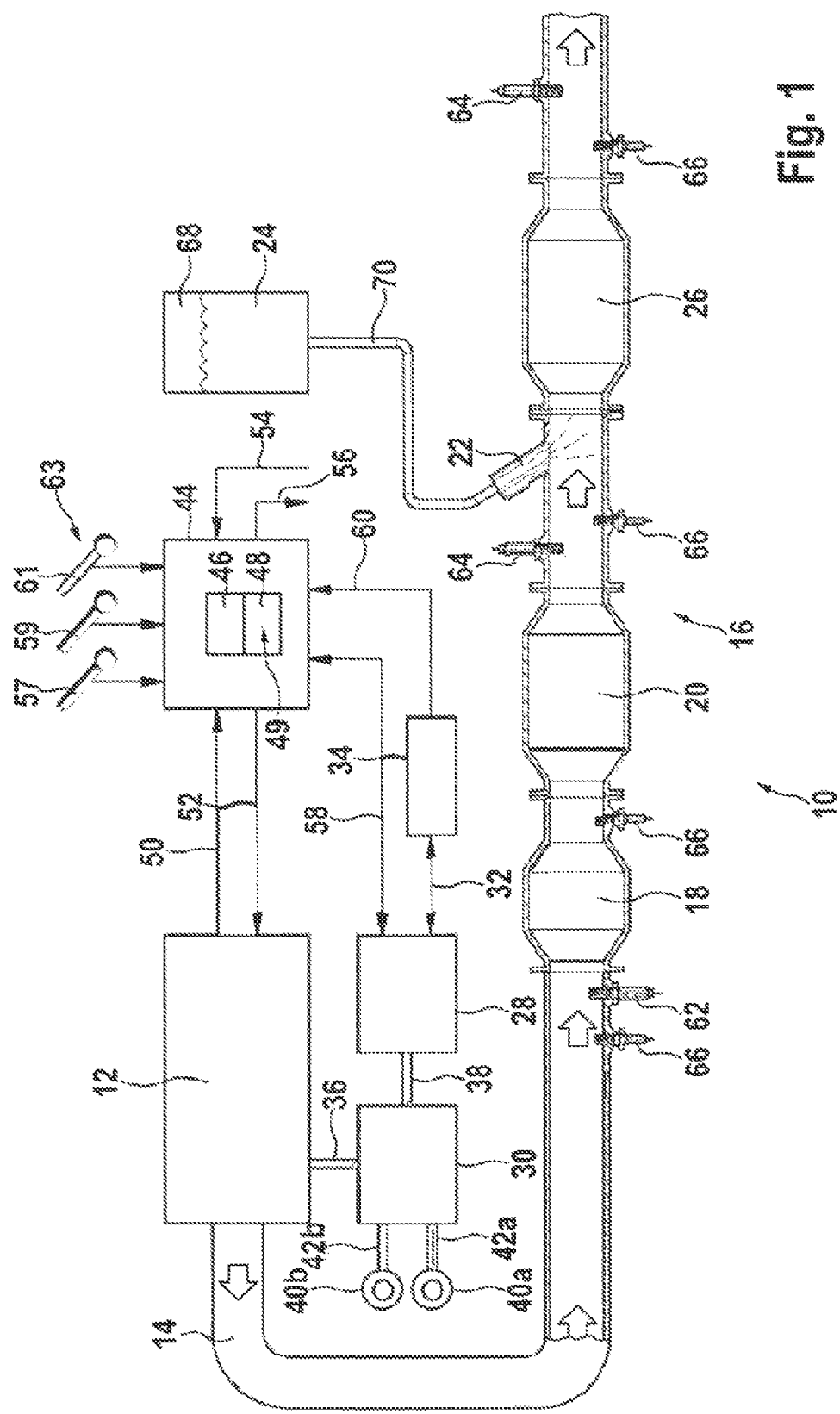
FIG. 1 shows a drive device of a motor vehicle with an internal combustion engine, a gearbox, an exhaust gas treatment system and an electric motor.

FIG. 1 shows a drive device 10 of a motor vehicle, not shown further. A region on the top left in the drawing depicts symbolically an internal combustion engine 12 in which via an exhaust gas pipe 14, exhaust gas can flow into an exhaust gas treatment system 16. In the present case the internal combustion engine 12 is designed as a diesel engine. The exhaust gas treatment system 16 is shown in a lower region of the drawing, and in the drawing the exhaust gas flows substantially from left to right. In the flow direction of the exhaust gas, here the exhaust gas treatment system 16 has a diesel oxidation catalyst 18, a diesel particle filter 20, a supply device 22 for a watery urea solution 24, and an SCR catalyst 26 (SCR means "selective catalytic reduction"). In the left middle region of the drawing are arranged an electric motor 28 and a gearbox 30. The electric motor 28 can exchange electrical energy with a battery 34 via an electric line 32. The gearbox 30 is coupled via a shaft 36 with the internal combustion engine 12 and via a shaft 38 with the electric motor 28. On the left of the gearbox 30 in the drawing are shown drive wheels 40a and 40b of the motor vehicle which are each coupled with the gearbox 30 via a shaft 42a and 42b.

The exhaust gas treatment system 16 of the internal combustion engine 12 furthermore comprises a lambda sensor 62 upstream of the diesel oxidation catalyst 18, and an NOx sensor 64 upstream and downstream of the SCR catalyst 26. Furthermore the exhaust gas treatment system 16 additionally has four temperature sensors 66 arranged at different points in the exhaust gas treatment system 16. Furthermore the urea solution 24 is arranged in a container 68 which is connected with the supply device 22 via a hydraulic line 70.

In the upper middle region of the drawing is arranged a control and/or regulator device 44 which comprises a computer program 46 and a data memory 48. The data memory 48 comprises at least one map 49. The control and/or regulator device 44 is connected with components of the internal combustion engine 12 via electric lines 50 and 52 and with components of the exhaust gas treatment system 16 via electric lines 54 and 56.

Furthermore the control and/or regulator device 44 is connected with the electric motor 28 via electric lines 58 and with a battery 34 via electric lines 60. The electric lines 50, 52, 54, 56, 58 and 60 each characterize a possible plurality of individual electrical connections which are not shown separately in FIG. 1. Furthermore signals from a gas pedal 57, a brake pedal 59 and a clutch pedal 61 are transmitted to the control and/or regulator device 44.

From a position of the gas pedal 57, where applicable also of the brake pedal 59 and clutch pedal 61 and from a gear engaged in the gearbox 30, a value 63 characterizing a driver's desired torque can be determined.

Also a value 120 characterizing a load ratio of the internal combustion engine 12 and electric motor 28 (see FIG. 4) can be determined. The load ratio can be defined for example as the quotient of a present mechanical power of the electric motor 28 to a present mechanical power of the internal combustion engine 12, which in total achieve the drive of the motor vehicle. In the present case the control and/or regulation device 44 both determines values 63 and 120 and controls or regulates the internal combustion engine 12 and electric motor 28. It is however also possible to determine values 63 and 120 in a constructionally separate unit and thereafter transmit these to the control and/or regulator device 44.

In operation of the drive device 10 or associated motor vehicle, the control and/or regulator device 44 controls the internal combustion engine 12, the electric motor 28 and the exhaust gas treatment system 16. For this the control and/or regulator device 44 evaluates the present positions of the gas pedal 57, brake pedal 59, clutch pedal 61 and a multiplicity of further operating states and/or signals. This applies in particular to the internal combustion engine 12 or the components fitted in the internal combustion engine 12, the electric motor 28, the battery 34, the gearbox 30, the drive wheels 40a and 40b and signals from the sensors described above in the exhaust gas treatment system 16. Furthermore the control and/or regulator device 44 has read and write access to the data memory 48, wherein using the stored data and/or the map 49 and/or mathematical operations, it controls and/or regulates the internal combustion engine 12, the electric motor 28 and the exhaust gas treatment system 16.

Figure 2:
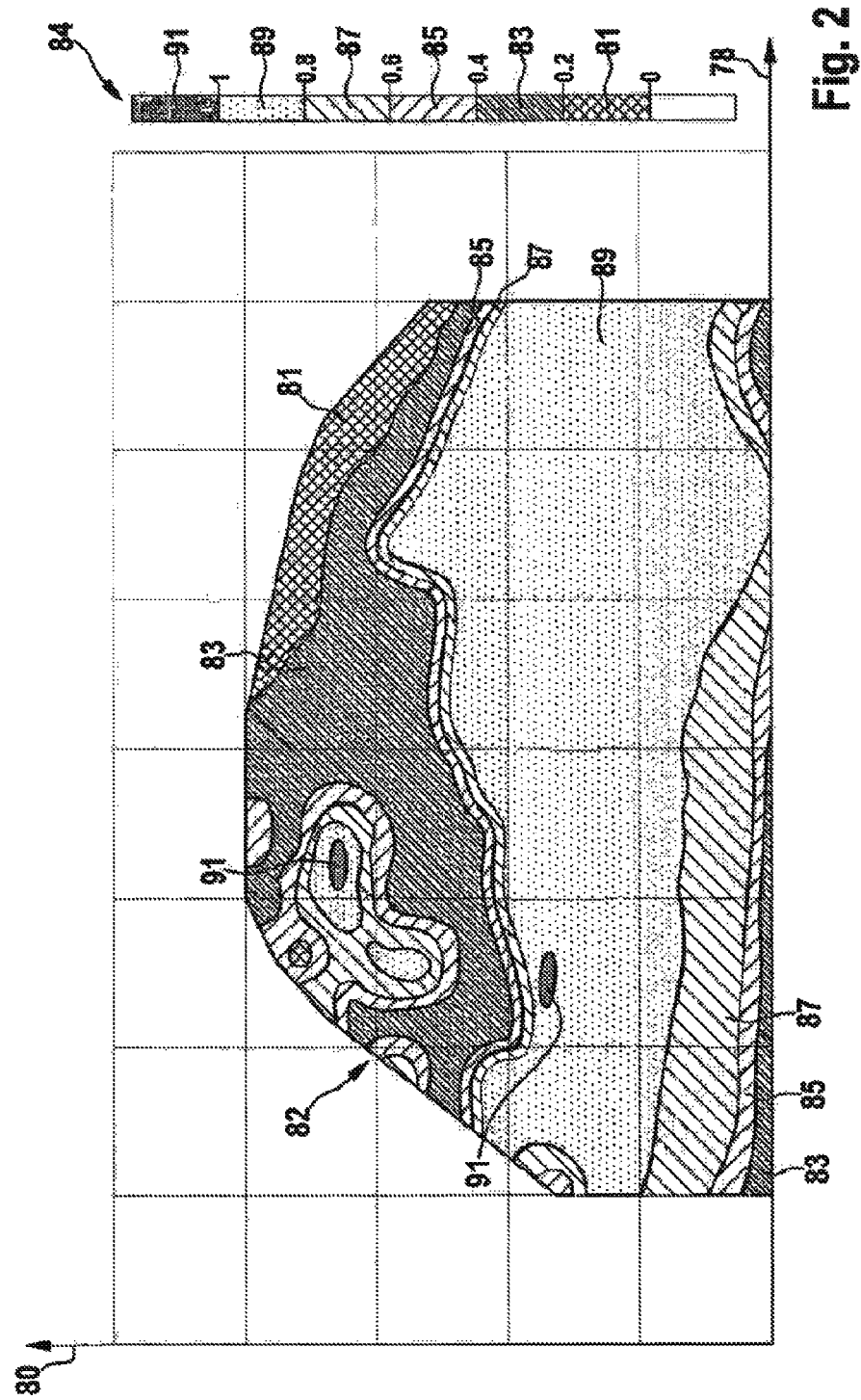
FIG. 2 shows a diagram with an NOx turnover over rotation speed and an effective mean pressure.

FIG. 2 shows a first diagram to depict operating states of the internal combustion engine 12. A rotation speed 78 of the internal combustion engine 12 is depicted on the abscissa of the coordinate system shown. The associated ordinate depicts an effective mean pressure 80 in a combustion chamber of the cylinders of the internal combustion engine 12. The effective mean pressure 80 characterizes a torque of the internal combustion engine 12. As a third value in the coordinate system of the FIG. 2, an NOx turnover 82 is shown, wherein the drawing regions characterized by different graphic patterns depict corresponding value ranges of the NOx turnover 82. An allocation of the value of the NOx turnover 82 to the graphic patterns is depicted via a value scale 84 in the right-hand region of FIG. 2. The value scale 84 has value ranges 81, 83, 85, 87 and 89 between zero and one, wherein a value of zero characterizes a poor NOx turnover 82 and a value of one a particularly good NOx turnover 82 in the SCR catalyst 26. The values of the present diagram can for example be stored in the map 49.

It is known that approximately in the middle region of the diagram there is a "favorable" range which substantially corresponds to value range 89. In value range 89 therefore a good to maximum NOx turnover 82 can take place with values between around 0.8 and 1. In the upper region of the diagram the NOx turnover 82 lies in a range from around 0.1 to 0.4 and is therefore considered unfavorable. Individual areas 91 admittedly have very good values up to around one, but these areas 91 are comparatively small. In a lower region of the diagram the NOx turnover 82 is again unfavorable. Said "middle" region comprises values of the effective mean pressure 80 between around 20% and 50% of the maximum effective mean pressure 80 of the internal combustion engine 12, and values of the rotation speed 78 between around 20% and 80% of a maximum rotation speed 78 of the internal combustion engine 12.

FIG. 2 therefore shows that a region for particularly good NOx turnover 82 in the SCR catalyst 26 lies in the middle load range of the internal combustion engine 12. At comparatively high and comparatively low loads (corresponding to a respective rotation speed 78 and/or a respective torque of the internal combustion engine 12), the NOx turnover 82 is relatively unfavorable. Using the diagram shown in FIG. 2 or the map 49, and a series of further data (see also FIG. 1), the control or regulation of the drive device 10 can be optimized. In particular the internal combustion engine 12 is controlled and/or regulated such that the torque and/or rotation speed 78 comprises approximately preferably a medium value. Amongst others the degrees of freedom allowed by the electric motor 28 (hybrid drive) are utilized in order to optimize both the efficiency of the drive device 10 and the exhaust gas composition, in particular the NOx turnover 82. The control and/or regulator device 44 thus effectively performs the function of an "SCR operating point coordinator".

Furthermore on cold start of the internal combustion engine 12, the control and/or regulator device 44 can allow prompt reaching of a minimum operating temperature of the SCR catalyst 26, wherein also—according to the diagram—operating states of the internal combustion engine 12 can be preferred which allow optimized NOx turnover 82. Further parameters such as for example the exhaust gas enthalpy (catalyst heating) and a proportion of so-called untreated NOx emissions can also be determined by the control and/or regulator device 44 and used accordingly to control the drive device 10.

In addition further signals of the exhaust gas treatment system 16 are taken into account. For example signals from the lambda sensor 62, the NOx sensors 64 and the temperature sensors 66. Furthermore a regeneration mode of the diesel particle filter 20 and a low charge state of the battery 34 are determined and taken into account for operation of the drive device 10. Furthermore the control and/or regulator device 44 is adapted to take into account different "prioritizations" i.e. defined priorities of different values affecting the drive device 10. For example the control and/or regulator device 44 can where applicable prioritize a driver's desired torque higher than the interests of the efficiency of the drive device 10.

The function of the "SCR operating point coordinator" is therefore, taking into account various values relevant to NOx turnover, to set an operating point of the internal combustion engine 12 which is as favorable as possible and hence "ideal". Peripheral conditions such as for example the driver's desired torque and/or any regeneration of the diesel particle filter 20 and/or a charge state of the battery 34 are also considered.

The "SCR operating point coordinator" can from this where applicable determine a present "torque request" which is used in the control and/or regulator device 44 to control the drive device 10. As described above, certain priorities are also taken into account, in particular in relation to the desired torque defined by the driver. The benefits of the "SCR operating point coordinator" generally increase with a rising relative power of the electric motor 28 in relation to the internal combustion engine 12.

Figure 3:
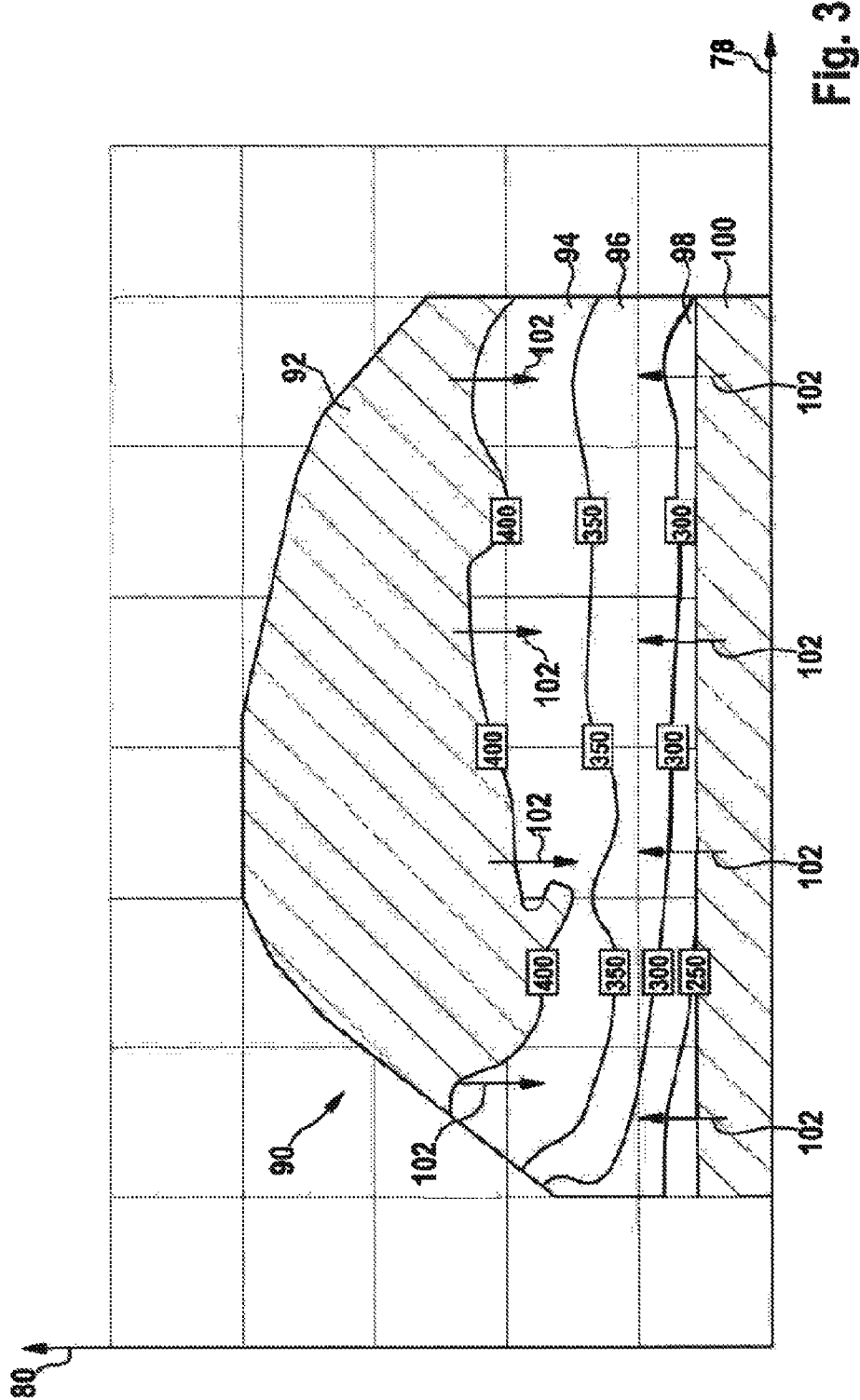
FIG. 3 shows a diagram with a temperature of an SCR catalyst over the rotation speed and the effective mean pressure.

FIG. 3 shows the coordinate system similar to that of FIG. 2 in which the abscissa depicts the rotation speed 78 of the internal combustion engine 12 and the ordinate the effective mean pressure 80. In contrast to FIG. 2, in FIG. 3 the third value is a temperature 90 in the SCR catalyst 26. The diagram in FIG. 3 has areas 92, 94, 96, 98 and 100 which characterize different temperature ranges of the SCR catalyst 26. For this the drawing depicts figures shown in small rectangular fields which give the respective temperature of the SCR catalyst 26 in degrees Celsius.

The area 92 comprises temperatures of the SCR catalyst 26 which are too hot for optimum NOx turnover 82. Correspondingly, the area 100 has a temperature range which is too cold for an optimum NOx turnover 82. Arrows 102 indicate a respective preference direction in the diagram whereby an adequate or good or very good NOx turnover 82 can be achieved in operation of the drive device 10.

Figure 4:
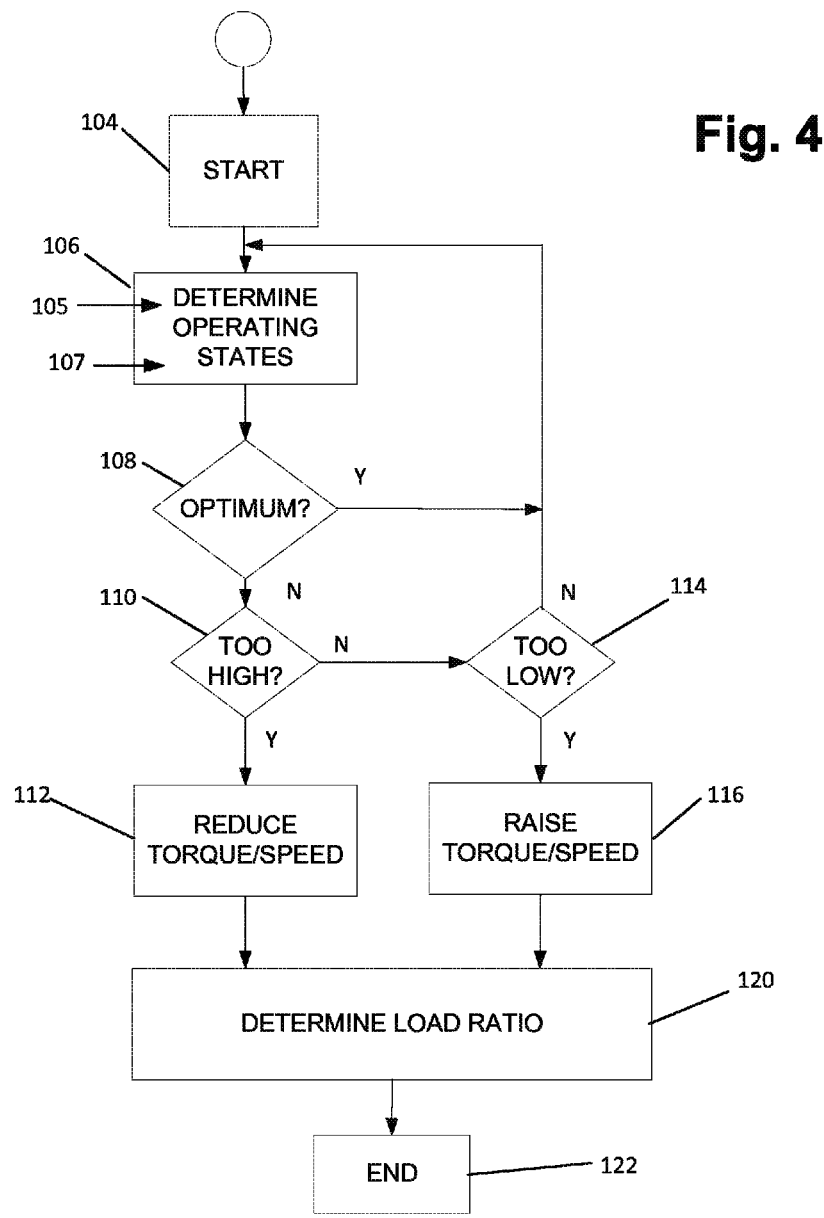
FIG. 4 shows a flow diagram for performance of a method to operate the drive device.

FIG. 4 shows a flow diagram for performance of a method for operating the drive device 10. The flow diagram can be processed for example by the computer program 46. The procedure shown in FIG. 4 begins in a start block 104.

In a following block 106 an operating state of the drive device 10 and the exhaust gas treatment system 16 is determined. For example for determining the operating point of the drive device 10 considered favorable for NOx turnover 82, thus in particular of the internal combustion engine 12 and electric motor 28, the following values or parameters can be taken into account as input values: temperature of exhaust gas; volume flow of exhaust gas; concentration of hydrocarbons in exhaust gas; concentration of nitrous oxides in exhaust gas upstream of exhaust gas treatment system 16; concentration of nitrous oxides in exhaust gas downstream of exhaust gas treatment system 16; ratio of NO2 (nitrogen dioxide) to NOx (other nitrous oxides) in the exhaust gas; enthalpy of exhaust gas; operating state of exhaust gas treatment system 16; driver's desired torque, which is determined from the position of the gas pedal 57, brake pedal 59, clutch pedal 61 and a gear engaged; and/or charge state of battery 34 or other energy accumulator.

Preferably in block 106 a lower and an upper limit value 105 and 107 are predefined in order to limit where applicable a "torque request" determined from the driver's desired torque.

A "favorable" operating point of the drive device 10 is when these input values have values which as a whole allow low untreated NOx emissions in the exhaust gas pipe 14 and/or a low NOx proportion in the exhaust gas downstream of the SCR catalyst 26 and/or particularly rapid reaching of the operating temperature of the SCR catalyst 26. At least part of the time also a compromise selected according to predefinable criteria between said input values can be a favorable operating point.

In a query block 108 it is determined whether an operating range of the exhaust gas treatment system 16 can allow an optimum NOx turnover 82. In particular untreated NOx emissions generated by the internal combustion engine 12, a temperature of the SCR catalyst 26 and a volume flow of the exhaust gas in the exhaust gas treatment system 16 are determined, for example by comparison with corresponding limit values. If the operating range allows at least an approximately "optimum" NOx turnover 82, the method branches back to the input of the block 106.

In the other case, in a following block 110 it is asked whether the temperature of the exhaust gas treatment system 16, in particular of the SCR catalyst 26, lies above a range suitable for optimum NOx turnover 82 and/or whether the volume flow of the exhaust gas may be too high, and/or whether the untreated NOx emissions generated by the internal combustion engine 12 are too high. If this is the case, the method branches to a following block 112.

If this is not the case, it is asked in a further query block 114 whether the temperature of the exhaust gas treatment system 16 may be too low for an optimum NOx turnover 82. If the temperature is not too low, the method branches back to the start of block 106. Otherwise it branches from query block 114 to a following block 116.

In block 112 using data from the map 49 stored in the data memory 48, the torque and/or rotation speed 78 of the internal combustion engine 12 are shifted towards lower values in order to relieve the load on the internal combustion engine 12. The procedure is then continued in a block 118.

In block 116 using data from the map 49 stored in the data memory 48, the torque and/or rotation speed 78 of the internal combustion engine 12 are shifted towards higher values in order to place greater load on the internal combustion engine 12. The procedure is then also continued in block 118.

In block 118 the change in torque and/or rotation speed 78 planned in blocks 112 and 116 is given a priority. For example a present driver's desired torque can be taken into account as preference. Also a value 120 characterizing the load ratio of the internal combustion engine 12 and electric motor 28 is determined. Then by means of a "hybrid coordinator" function performed by the computer program 46, which can take necessary data or values from the SCR operating point coordinator, an operating state of the drive device 10 is changed as applicable. The procedure shown in FIG. 4 ends in a subsequent end block 122.

For example at a comparatively low torque and/or low rotation speed 78 of the internal combustion engine 12, the electric motor 28 can be operated as a generator in order to load the internal combustion engine 12 in addition to the power required for the present drive mode of the motor vehicle and thus bring it into the desired operating point range. If the drive device 10 is adapted for this, where applicable another gear can be selected automatically. Correspondingly, at a comparatively high torque and/or high rotation speed 78 of the internal combustion engine 12, the electric motor 28 can be operated as a motor to relieve the load on the internal combustion engine 12 and thus bring it into the desired operating point range.

In particular by means of the procedure shown in FIG. 4, using the "degrees of freedom" specified by the drive device 10, the operating point of the internal combustion engine 12 is optimized so that the NOx turnover 82 of the exhaust gas treatment system 16 can be maximized. For example the internal combustion engine 12 can be controlled and/or regulated such that the torque and/or rotation speed 78 have preferably an approximately medium value. Also a "temperature profile" of the SCR catalyst 26 or exhaust gas treatment system 16 and/or an "untreated NOx emission profile" of the internal combustion engine 12 can be implemented with optimum efficiency.

The invention claimed is:

1. A method for operating a drive device (10), comprising an internal combustion engine (12) and at least one further drive assembly (28) which is not an internal combustion engine (12), wherein an exhaust gas from the internal combustion engine (12) is treated by an exhaust gas treatment system (16), the method comprising:
   determining the internal combustion engine (12) is not in an operating point defined as favorable for the exhaust gas treatment; and
   bringing the operating point of the internal combustion engine (12) into the range defined as favorable for the exhaust gas treatment using the further drive assembly (28);
   wherein the operating point is defined as favorable for the exhaust gas treatment is determined using a temperature of the exhaust gas and a ratio of NO2 to NOx in the exhaust gas.

2. The method according to claim 1, characterized in that the range of the operating points of the internal combustion engine (12) defined as favorable for exhaust gas treatment are defined by at least one map (49) and corresponding limit values, the map (49) formed by an effective mean pressure (80) and a rotation speed (78).

3. The method according to claim 1, characterized in that the operating point defined as favorable for the exhaust gas treatment is determined using at least one of the following input values:
   volume flow of exhaust gas;
   concentration of hydrocarbons in the exhaust gas;
   concentration of nitrous oxides in the exhaust gas upstream of the exhaust gas treatment system (16);
   concentration of nitrous oxides in the exhaust gas downstream of the exhaust gas treatment system (16);
   enthalpy of the exhaust gas;
   operating state of the exhaust gas treatment system (16);
   driver's desired torque;
   gear engaged; and
   charge state of an energy accumulator (34).

4. The method according to claim 3, characterized in that the further drive assembly is an electric motor (28) which is supplied with energy via an additional accumulator, and that using at least one of the input values, a value (63) characterizing the driver's desired torque and a value (120) characterizing a load ratio of the internal combustion engine (12) and electric motor (28) are determined, and that the values determined (63, 120) are transmitted to a control device (44) for the internal combustion engine (12) and for the electric motor (28).

5. The method according to claim 3, characterized in that the further drive assembly is supplied with energy via an additional accumulator, and that using at least one of the input values, a value (63) characterizing the driver's desired torque is determined, and that the value determined (63) is transmitted to a control device (44) for the internal combustion engine (12) and for the electric motor (28).

6. The method according to claim 2, characterized in that a lower and an upper limit value (105, 107) are predefined to limit the driver's desired torque.

7. The method according to claim 3, characterized in that the further drive assembly is supplied with energy via an additional accumulator, and that using at least one of the input values, a value (120) characterizing a load ratio of the internal combustion engine (12) and electric motor (28) is determined, and that the value determined (120) is transmitted to a control device (44) for the internal combustion engine (12) and for the electric motor (28).

8. The method according to claim 1, characterized in that the internal combustion engine (12) is a diesel engine and that the exhaust gas treatment system (16) comprises an SCR catalyst (26).

9. The method according to claim 1, characterized in that the further drive assembly is supplied with energy via an additional accumulator.

10. The method according to claim 9, wherein the accumulator is an electric, hydraulic or thermal accumulator.

11. The method according to claim 9, wherein the accumulator is a hydraulic motor.

12. The method according to claim 9, wherein the accumulator is an electric motor (28).

13. The method according to claim 1, characterized in that the internal combustion engine (12) is controlled and/or regulated such that a torque of the internal combustion engine (12) is between 20% and 50% of the maximum torque of the internal combustion engine (12).

14. The method according to claim 1, characterized in that the internal combustion engine (12) is controlled and/or regulated such that a rotation speed (78) of the internal combustion engine (12) is between around 20% and 80% of the maximum rotation speed of the internal combustion engine (12).

15. The method according to claim 1, characterized in that at a comparatively low torque and/or low rotation speed (78) of the internal combustion engine (12), the electric motor (28) is operated as a generator in order to load the internal combustion engine (12) additionally and thus bring it into the desired operating point range.

16. The method according to claim 1, characterized in that at a comparatively high torque and/or high rotation speed (78) of the internal combustion engine (12), the electric motor (28) is operated as a motor in order to relieve the load on the internal combustion engine (12) and thus bring it into the desired operating point range.

17. The method according to claim 1, characterized in that it is carried out using stored data and/or at least one map (49) and/or at least one mathematical operation.

18. The method according to claim 1, characterized in that the drive device (10) is in particular in a motor vehicle.

19. A control device (44) for a motor vehicle, characterized in that it is adapted to perform a method according to claim 1.

20. A computer program (46) for a control device (44) of a motor vehicle, characterized in that it is programmed to perform a method according to claim 1.

* * * * *